US010099163B2

(12) United States Patent
Lee

(10) Patent No.: US 10,099,163 B2
(45) Date of Patent: Oct. 16, 2018

(54) WATER PURIFIER

(71) Applicant: Chung-Ming Lee, Taichung (TW)

(72) Inventor: Wen-Pin Lee, Taichung (TW)

(73) Assignee: Chung-Ming Lee, Taichung (TW)

( * ) Notice: Subject to any disclaimer, the term of this patent is extended or adjusted under 35 U.S.C. 154(b) by 169 days.

(21) Appl. No.: 15/255,449

(22) Filed: Sep. 2, 2016

(65) Prior Publication Data

US 2018/0065068 A1  Mar. 8, 2018

(51) Int. Cl.
| | |
|---|---|
| *B01D 29/56* | (2006.01) |
| *B01D 35/14* | (2006.01) |
| *C02F 1/00* | (2006.01) |
| *C02F 1/48* | (2006.01) |
| *B01D 35/30* | (2006.01) |
| *C02F 1/28* | (2006.01) |

(52) U.S. Cl.
CPC .......... *B01D 35/308* (2013.01); *B01D 29/56* (2013.01); *B01D 35/14* (2013.01); *C02F 1/005* (2013.01); *B01D 1/008* (2013.01); *C02F 1/283* (2013.01); *C02F 1/48* (2013.01)

(58) Field of Classification Search
CPC .... C02F 9/005; C02F 2201/006; B01D 61/08; B01D 61/10; B01D 2311/2649; B01D 61/20; B01D 2201/0415
See application file for complete search history.

(56) References Cited

U.S. PATENT DOCUMENTS

| | | | | |
|---|---|---|---|---|
| 5,132,017 A | * | 7/1992 | Birdsong | B01D 61/08 210/267 |
| 5,254,242 A | * | 10/1993 | van der Meer | B01D 35/14 210/100 |
| 7,101,480 B2 | * | 9/2006 | Carlotto | C02F 9/005 210/232 |
| 7,513,996 B2 | * | 4/2009 | Kloos | B01D 61/022 210/249 |
| 7,708,882 B2 | * | 5/2010 | Kobayashi | B01D 61/18 210/209 |

(Continued)

FOREIGN PATENT DOCUMENTS

WO     WO2012/083627     *  6/2012    ............... C02F 1/48

OTHER PUBLICATIONS

Derwent abstract 2016-76251A, Derwent week Feb. 2017.*

*Primary Examiner* — Ana M Fortuna
(74) *Attorney, Agent, or Firm* — Muncy, Geissler, Olds & Lowe, P.C.

(57) ABSTRACT

A water purifier is provided, including a framework, including a plurality of vertical supporting members respectively vertically arranged in intervals and a metal frame disposed on top ends of the plurality of vertical supporting members, the metal frame having two first through holes; two filtering mechanisms, received in the framework and connected in series, one of the two filtering mechanisms for being connected to a water source; a magnetizer, received in the framework, the magnetizer connected to the other of the two filtering mechanisms in series and being communicable with outside; a shell, covering the framework, including a plastic cover covering the metal frame, the plastic cover including two first pass holes corresponding to the two first through holes and two cover bodies disposed on the two first pass holes, the two cover bodies being capable of sealing the two filtering mechanisms respectively.

11 Claims, 9 Drawing Sheets

(56) References Cited

U.S. PATENT DOCUMENTS

| | | | | |
|---|---|---|---|---|
| 8,398,852 B2* | 3/2013 | Burrows | ................ | B01D 61/04 |
| | | | | 210/232 |
| 2006/0219613 A1* | 10/2006 | Scheu | ................ | B01D 61/022 |
| | | | | 210/108 |
| 2011/0049049 A1* | 3/2011 | Benner | ................ | B01D 61/04 |
| | | | | 210/636 |
| 2013/0168303 A1* | 7/2013 | Appling | ............. | A61M 1/3626 |
| | | | | 210/95 |
| 2014/0091041 A1* | 4/2014 | Nielsen | ................ | C02F 1/004 |
| | | | | 210/638 |
| 2018/0065068 A1* | 3/2018 | Lee | ................ | B01D 35/308 |

* cited by examiner

WATER PURIFIER

BACKGROUND OF THE INVENTION

Field of the Invention

The present invention relates to a water purifier.

Description of the Prior Art

A water purifier which can provide clean water source (for example, a water dispenser) has been an essential home appliance for providing drinking water for consumers. A common water dispenser has a plurality of filter cartridges which are connected in series so to filter water thoroughly to produce clean and drinkable water.

However, a structure of the common water dispenser mostly has a shell which is completely made of metal or plastic. The shell made of metal is heavy, and it is difficult and costly to manufactured; the shell made of plastic is light and easily manufactured, but the structural strength is weak and may be easily broken.

In addition, the conventional water dispenser has some other problems, for example, there is no authentication and controlling mechanisms regarding the filter cartridges on the market, and the filter cartridges of different companies, models, or materials have different filtering performance so that the water quality and safety cannot be guaranteed. Besides, a company end cannot obtain the water information of a user end, so it is inconvenient to replace the filter cartridge.

The present invention has arisen to mitigate and/or obviate the afore-described disadvantages.

SUMMARY OF THE INVENTION

The major object of the present invention is to provide a water purifier, which can reinforce a thorough structural strength and control water locally or remotely so as to ensure the quality and safety of drinking water.

To achieve the above and other objects, a water purifier is provided, including a framework, including a plurality of vertical supporting members which are respectively vertically arranged in intervals and a metal frame which is disposed on top ends of the plurality of vertical supporting members, the metal frame having two first through holes; two filtering mechanisms, received in the framework and connected in series, one of the two filtering mechanisms for being connected to a water source; a magnetizer, received in the framework, the magnetizer connected to the other of the two filtering mechanisms in series and being communicable with outside; a shell, covering the framework, including a plastic cover covering the metal frame, the plastic cover including two first pass holes which correspond to the two first through holes and two cover bodies which are disposed on the two first pass holes, the two cover bodies being capable of sealing the two filtering mechanisms respectively.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
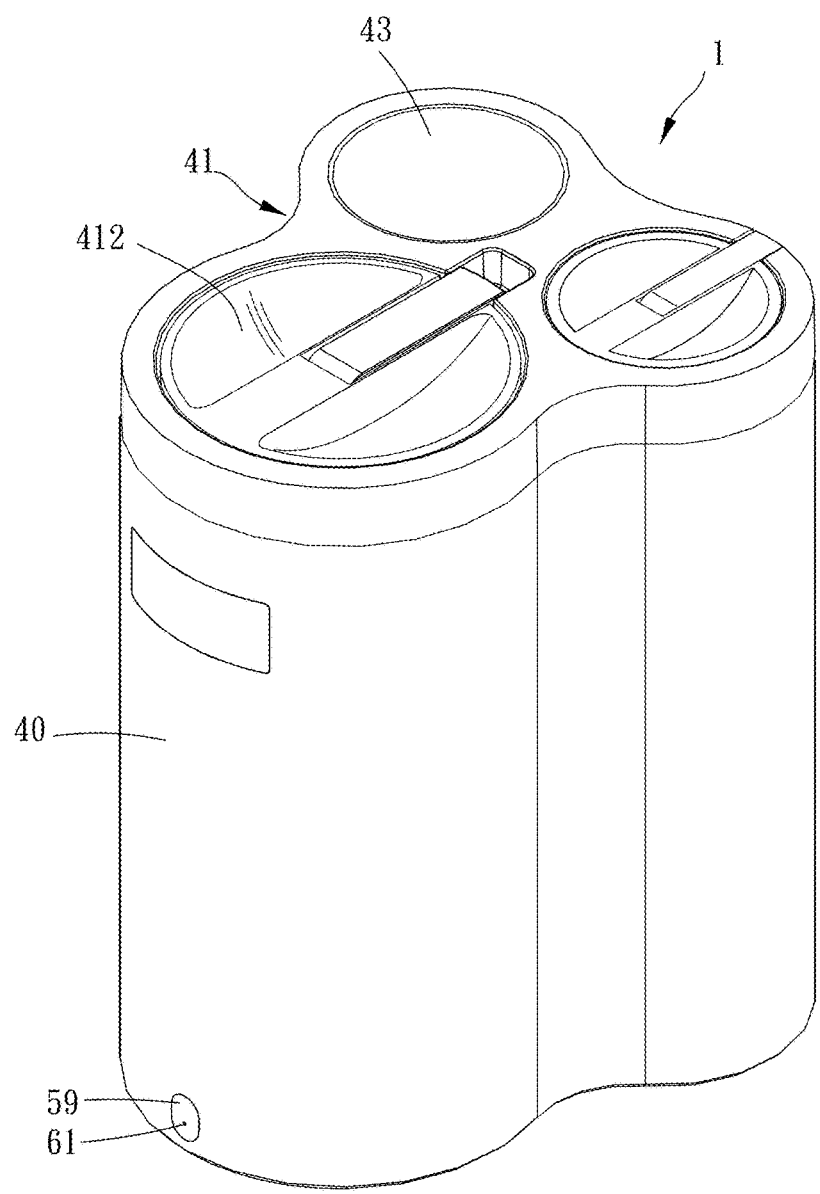
FIG. 1 is a stereogram of a preferred embodiment of the present invention.
Figure 2:
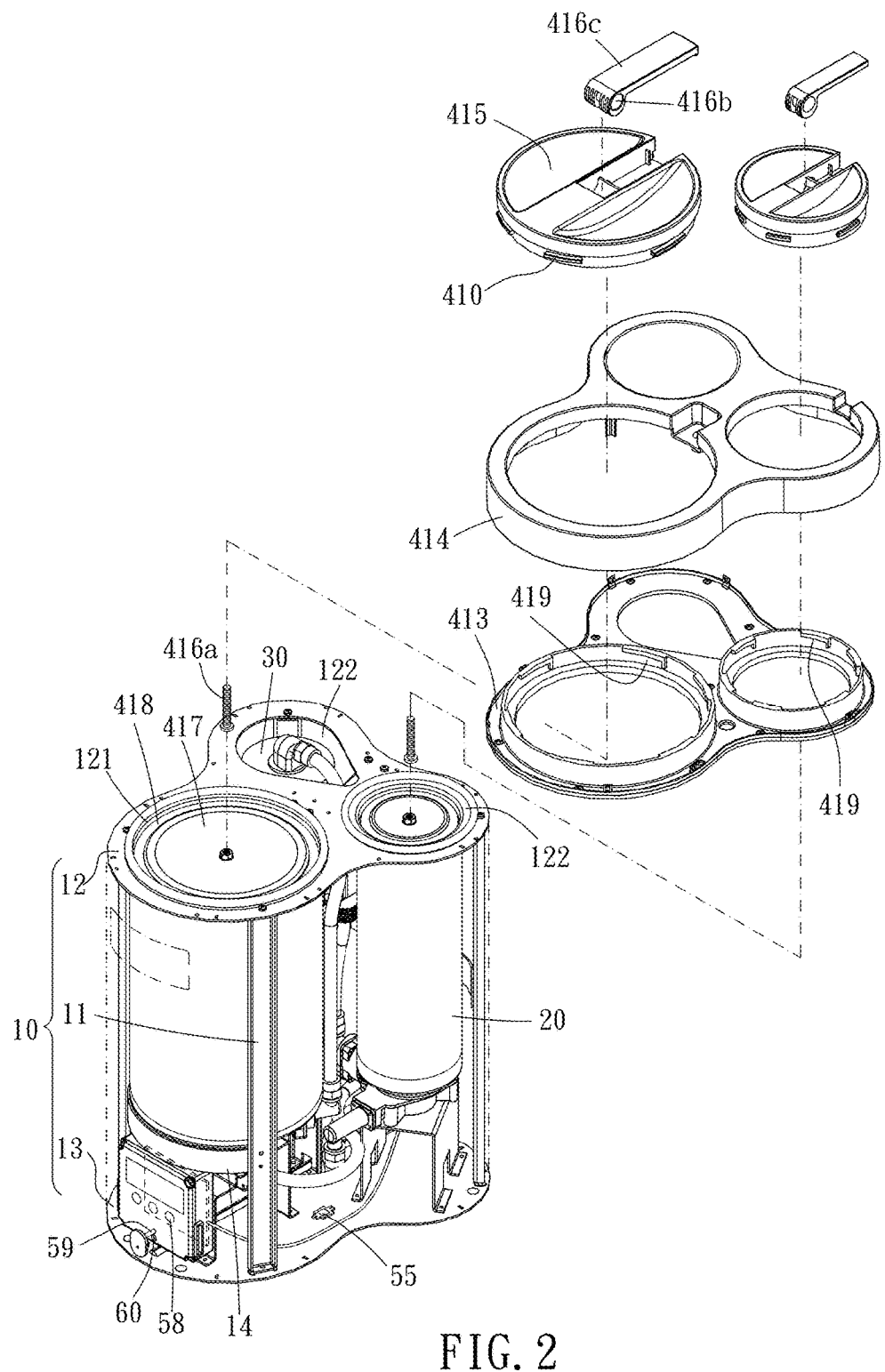
FIG. 2 is a breakdown view of the preferred embodiment of the present invention.
Figure 3:
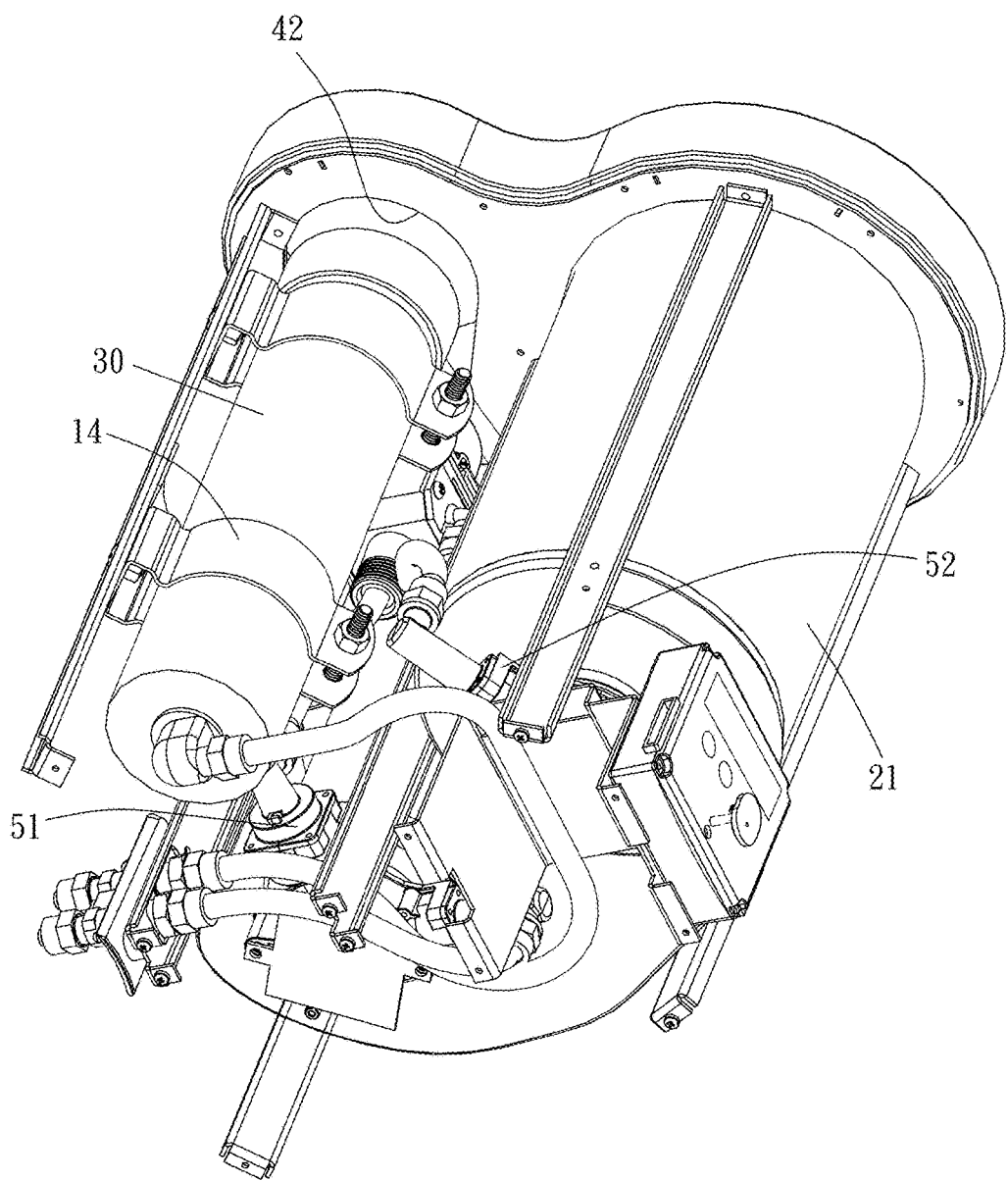
FIG. 3 is a partially stereogram of the preferred embodiment of the present invention.
Figure 4:
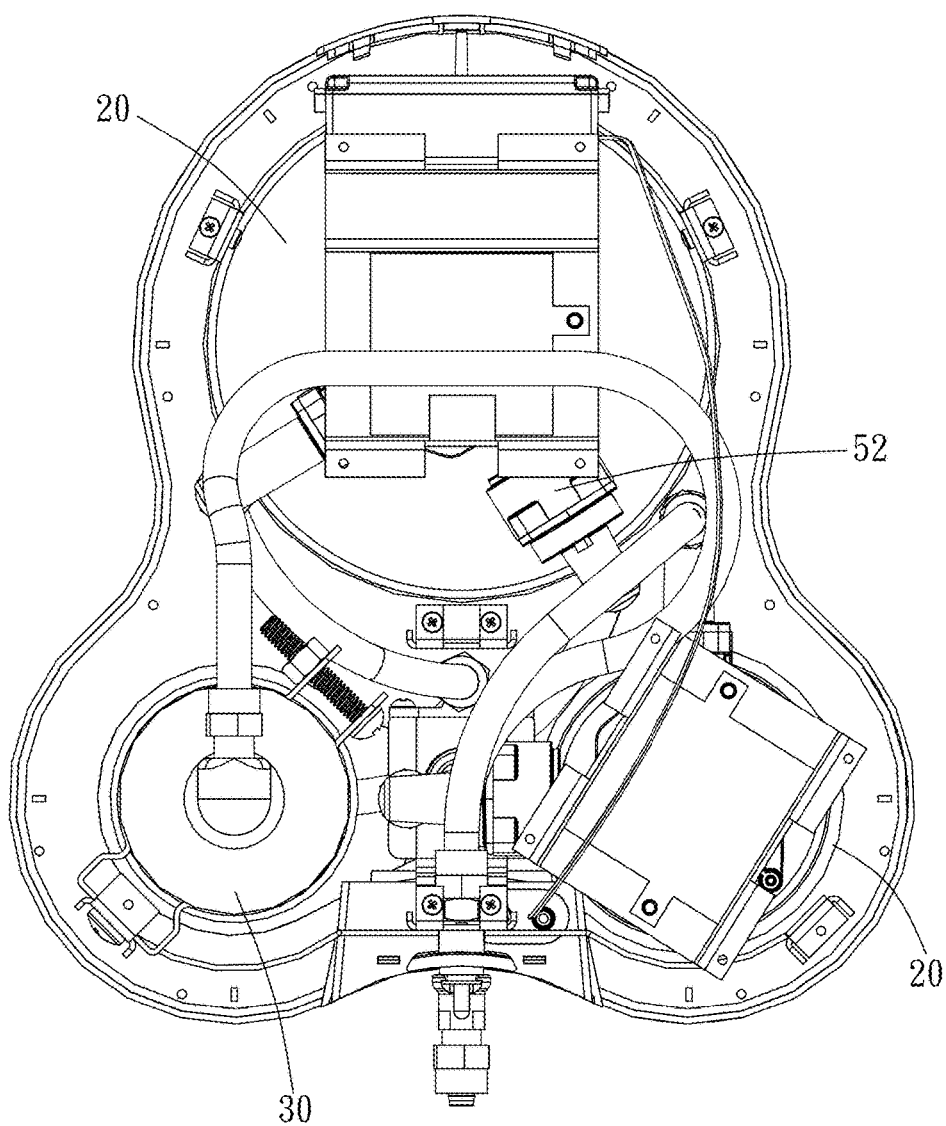
FIG. 4 is a bottom view of FIG. 3.
Figure 5:
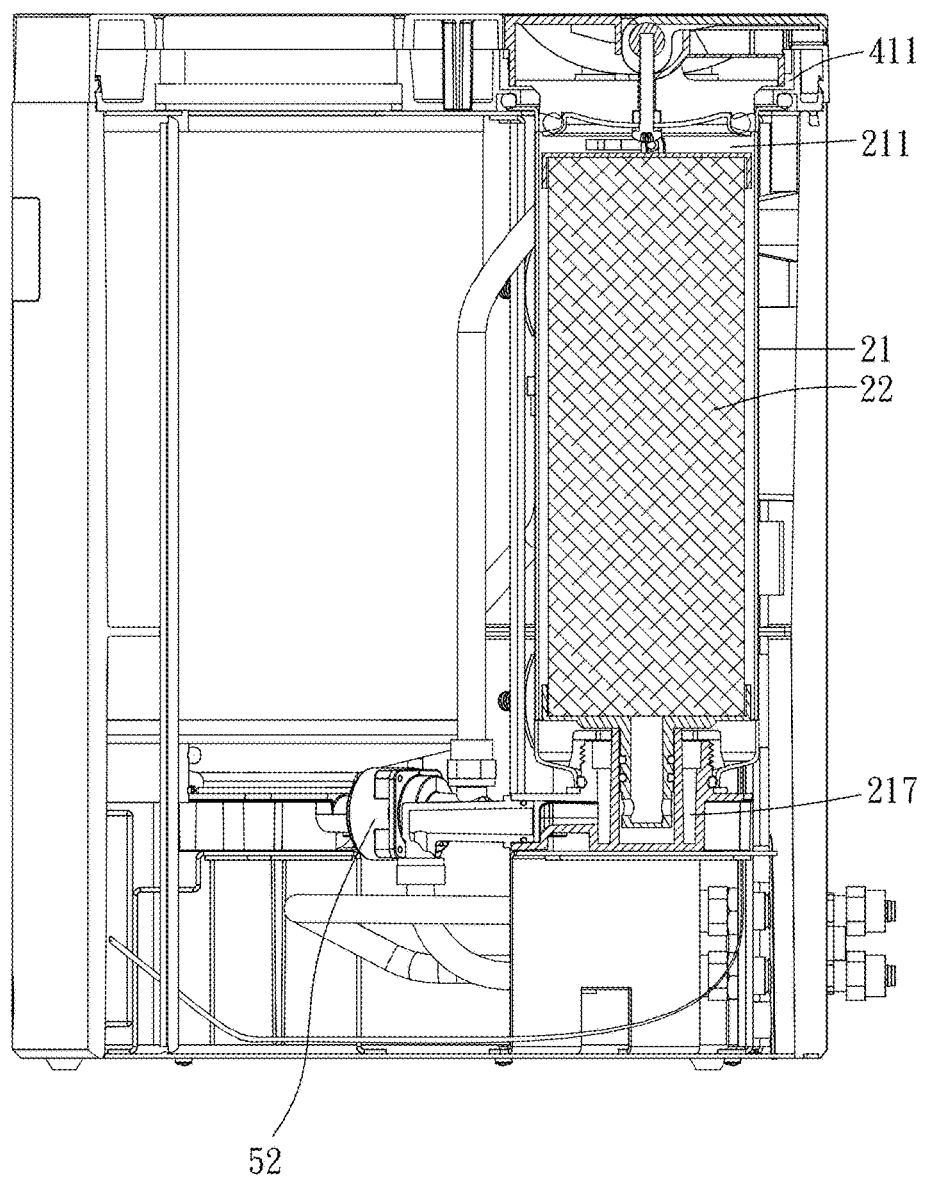
FIG. 5 is a cross-sectional view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 10 for a preferred embodiment of the present invention. A water purifier 1 includes a framework 10, two filtering mechanisms 20, a magnetizer 30 and a shell 40.

The framework 10 includes a plurality of vertical supporting members 11 which are respectively vertically arranged in intervals and a metal frame 12 which is disposed on top ends of the plurality of vertical supporting members 11, and the metal frame 12 has two first through holes 121. The two filtering mechanisms 20 are received in the framework 10 and connected in series, and one of the two filtering mechanisms 20 is for being connected to a water source. The magnetizer 30 is received in the framework 10, and the magnetizer 30 is connected to the other of the two filtering mechanisms 20 in series and being communicable with outside. The shell 40 covers the framework 10 and includes a plastic cover 41 covering the metal frame 12, the plastic cover 41 includes two first pass holes 411 which correspond to the two first through holes 121 and two cover bodies 412 which are disposed on the two first pass holes 411, and the two cover bodies 412 are capable of sealing the two filtering mechanisms 20 respectively. Therefore, the framework 10 reinforces the thorough structural strength, and the metal frame 12 and the plastic cover 41 reinforce the structural strength of parts that are often operated.

The framework 10 further includes a bottom board 13, and the bottom board 13 and the metal frame 12 are detachably disposed on (for example, lockably connected to) two opposite ends of the plurality of vertical supporting members 11. Preferably, the plurality of vertical supporting members 11, the metal frame 12 and the bottom board 13 are made of metal and manufactured through pressing so that the structure is easy and quick to make and in high strength. The plastic cover 41 further includes a plastic frame 413 which is detachably disposed on (for example, screwed to) the metal frame 12 and a cover frame 414 which covers the plastic frame 413, and the plastic frame 413 and the cover frame 414 are penetrated corresponding to each other to form the two first pass holes 411. Preferably, the framework 10 further includes a plurality of hooping frames 14, and the plurality of hooping frames 14 are adjustably hooped on the two filtering mechanisms 20 and the magnetizer 30 and can be used on the filtering mechanisms and the magnetizers in different dimensions.

The two filtering mechanisms 20 include a ceramic filter cartridge and an active carbon filter cartridge, the active carbon filter cartridge is a second filter cartridge and communicates with the magnetizer 30, and sequences of the ceramic filter cartridge and the active carbon filter cartridge may be exchanged. Each said filtering mechanism 20 includes a barrel member 21 and a filter cartridge 22, and the barrel member 21 may be a metal barrel made of stainless steel or similar materials or a plastic barrel in sufficient structural strength.

Figure 6:
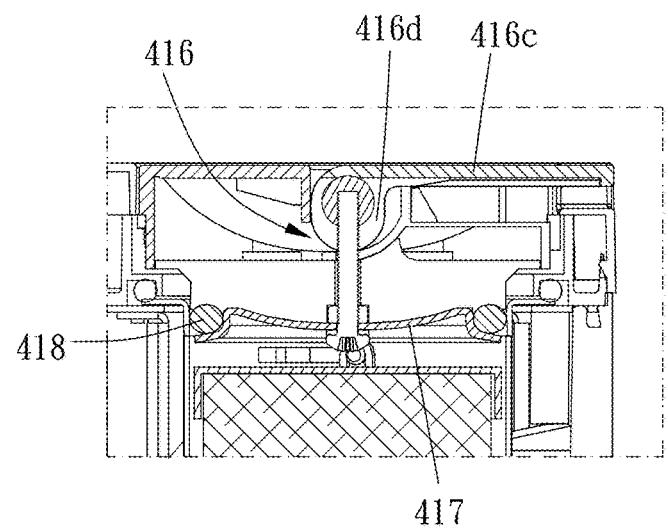
FIGS. 6 to 7 are drawings showing the preferred embodiment of the present invention in use.
Figure 7:
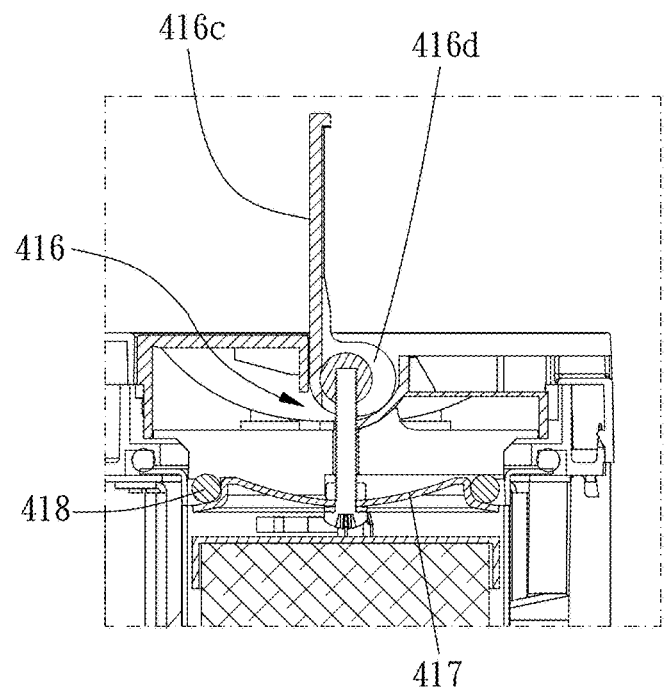
Figure 8:
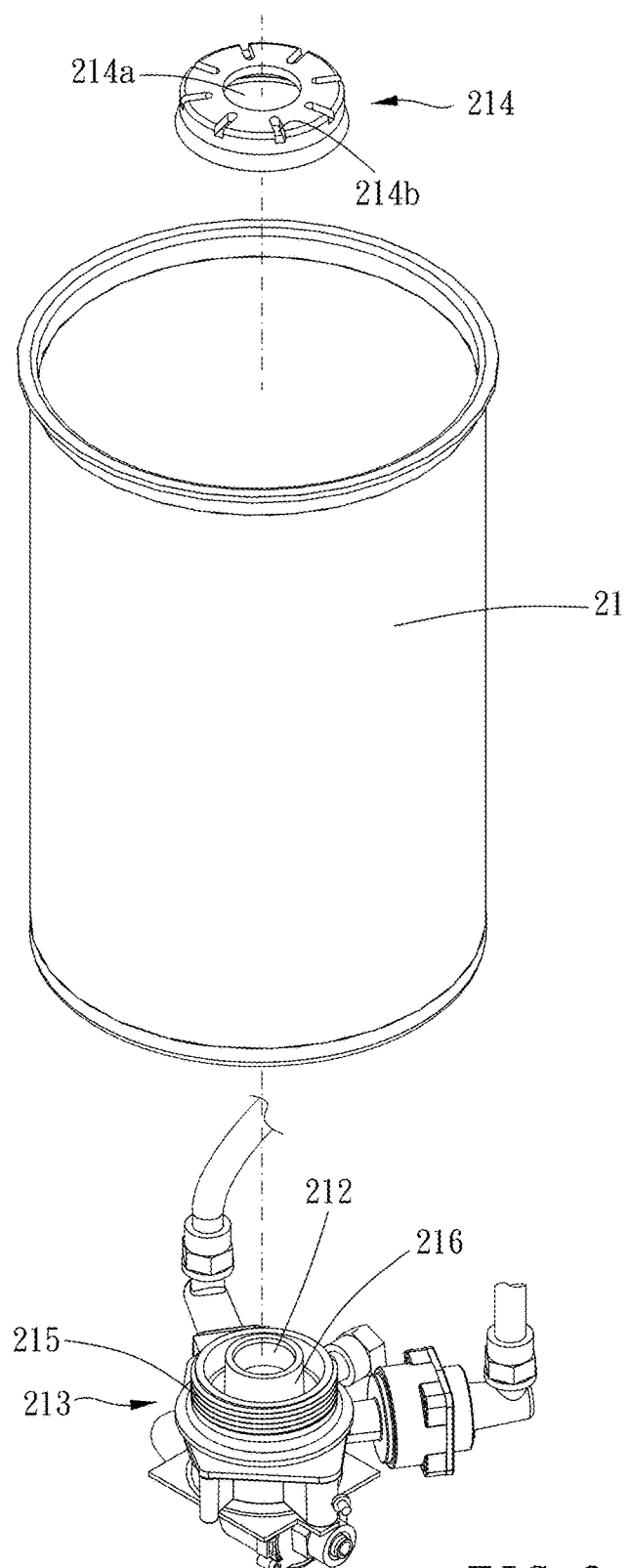
FIG. 8 is a partially breakdown view of the preferred embodiment of the present invention.
Figure 9:
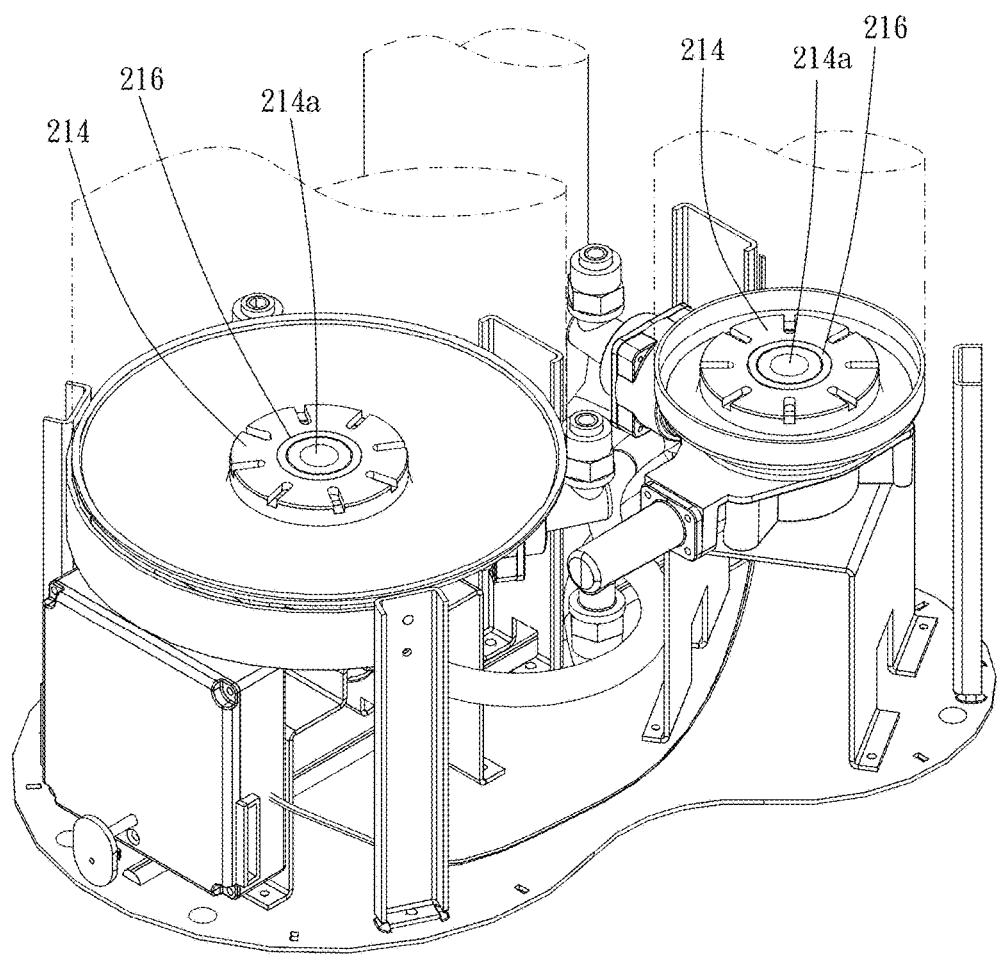
FIG. 9 is another partially stereogram of the preferred embodiment of the present invention.
Figure 10:
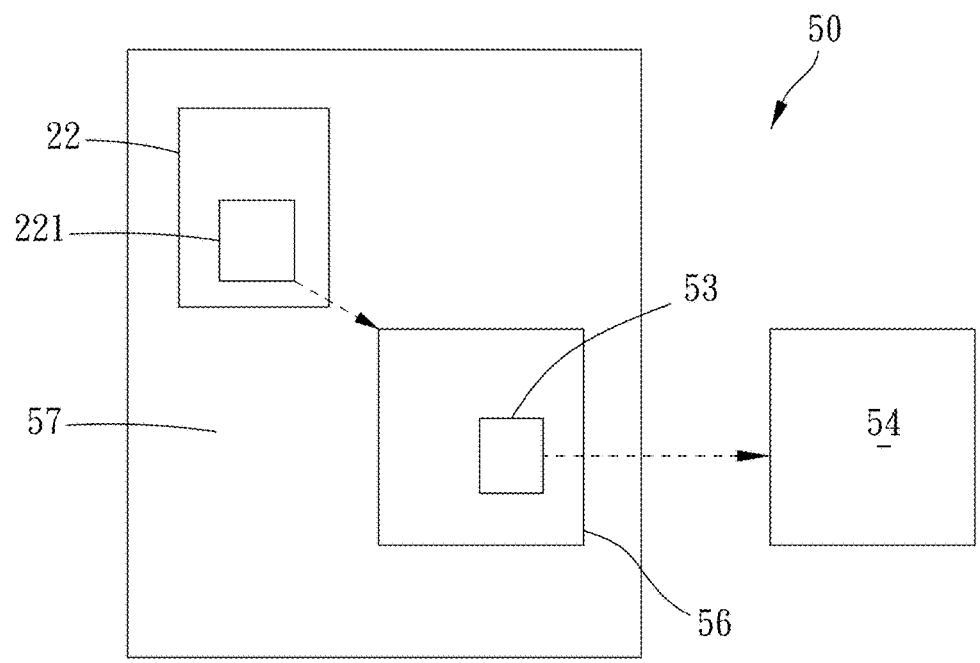
FIG. 10 is a diagram of an electric controlling unit of the preferred embodiment of the present invention.

Specifically, each said cover body 412 includes a cover main body 415, a pressurizing mechanism 416 which is pivoted to the cover main body 415, a pressurizing sheet 417 which is connected to the pressurizing mechanism 416, and a flexible ring 418 (for example, a rubber ring or other similar objects) which is disposed between the cover main body 415 and a periphery of the pressurizing sheet 417. Movement of the pressurizing mechanism 416 drives the pressurizing sheet 417 to move toward the cover main body 415 and squeeze the flexible ring 418, and the flexible ring 418 is squeezed to deform radially to contact an inner wall of the filtering mechanism 20 tightly (as shown in FIG. 6). Two ends of the barrel member 21 which are opposite to each other respectively have an inlet opening 211 which is sealed by the flexible ring 418 and an inserting opening 212 which communicates with and between the water source and the magnetizer 30, and the filter cartridge 22 is inserted from the inlet opening 211, into the barrel member 21 and into the inserting opening 212 upside down via a communicating connector. One of two ends of the barrel member 21 has a connecting base 213 and a cover member 214, the connecting base 213 includes an exterior threaded ring 215 and an interior connecting ring 216 surrounded by the exterior threaded ring 215, the exterior threaded ring 215 and the interior connecting ring 216 define a water inlet space 217, the interior connecting ring 216 has the inserting opening 212, the cover member 214 includes a central through opening 214a and a plurality of communicating holes 214b which surround the central through opening 214a, the cover member 214 is screwed to the exterior threaded ring 215, and the plurality of communicating holes 214b communicate with the water inlet space 217 and an interior of the barrel member 21. A water flow enters into the water inlet space 217, through the plurality of communicating holes 214b and into the interior of the barrel member 21 and infiltrates the filter cartridge 22. After being filtered, the water flow is guided out of the connecting base 213 from the communicating connector and the inserting opening 212.

The plastic frame 413 radially and protrudingly has a plurality of restricting grooves 419, the cover main body 415 is integrally formed and protrudingly has a plurality of restricting ribs 410 on a circumferential side thereof, and each said restricting rib 410 is releasably rotated and engaged with one of the restricting grooves 419 so that the cover main body 415 can be quickly and stably connected to the plastic frame 413. The cover main body 415 may have a multi-piece structure.

The pressurizing mechanism 416 includes a screw member 416a which is disposed through the pressurizing sheet 417 and the cover main body 415, a pivotal axle 416b which is attached to one end of the screw member 416a and located on two opposite sides of cover main body 415 with the pressurizing sheet 417, and a handle member 416c which is pivoted to the pivotal axle 416b, the handle member 416c includes an abutting head 416d which is eccentrically pivoted to the pivotal axle 416b, when the handle member 416c is swung, the abutting head 416d abuts against the cover main body 415 and pulls the pressurizing sheet 417 to squeeze the flexible ring 418, and the flexible ring 418 is squeezed to deform radially to contact an inner wall of the inlet opening 211 of the barrel member 21 tightly.

In this embodiment, the metal frame 12 further has a second through hole 122 which corresponds to the magnetizer 30, the plastic frame 413 and the cover frame 414 are further penetrated corresponding to each other to form a second pass hole 42, and the shell 40 further includes a sealing cover 43 covering the second pass hole 42 for a user to maintain and/or replace members. The water purifier 1 further includes an electric controlling unit 50 and a throttle valve 51 which is electrically connected to the electric controlling unit 50, a flow meter 52 which is electrically connected to the electric controlling unit 50, a wireless transmitter 53 which is electrically connected to the electric controlling unit 50, a wireless receiver 54 and a water leak sensor 55 which is disposed on a bottom portion of the framework 10 and electrically connected to the electric controlling unit 50.

The throttle valve 51 is connected to and between the water source and a water outlet end of the magnetizer 30, for example, two ends of the throttle valve 51 are respectively connected to and between the two filtering mechanisms 20 (the ceramic filter cartridge and the active carbon filter cartridge). The filter cartridge 22 of each said filtering mechanism 20 has an identification identity 221 (for example, an authentication brand, an authentication model or other authentication information represented by radio frequency identification (RFID) labels), the electric controlling unit 50 includes an identifier 56 (for example, an identification coil which may have a wireless transmitting device), the identifier 56 identifies and compares the identification identity 221 of each said filtering mechanism 20, if the identification identity 221 matches one of at least one preset identification identities (which can be saved in the electric controlling unit 50 or an exterior device, such as a central unit, a remote server, a mobile device or similar devices), the electric controlling unit 50 controls the throttle valve 51 to allow water to flow through the throttle valve 51, and if the identification identity 221 does not match any of the at least one preset identification identity, the electric controlling unit 50 controls the throttle valve 51 to prevent the water purifier from providing drinking water which is not completely purified or drinkable. The flow meter 52 is connected to and between one of the filtering mechanisms 20 (the active carbon filter cartridge) and the magnetizer 30, and when a total amount of water flowing to the magnetizer 30 reaches a preset amount, the electric controlling unit 50 controls the throttle valve 51 to prohibit water from flowing through the throttle valve 51 so as to ensure the quality and safety of the drinking water provided. The wireless transmitter 53 and the wireless receiver 54 can transmit data of each said filtering mechanism 20 wirelessly (through Wi-Fi or a Bluetooth device), and the data at least includes the at least one preset identification identity and may also include the total amount of water, assembly or replacement dates of the members, or dates that the elements are to be assembled or replaced. Preferably, all the data of the operation of the water purifier can be monitored instantly, online, offline or remotely through the wireless transmitter 53 and the wireless receiver 54, and the user end may get reminders or suggestions about water usage or appliances based on the data.

Preferably, the electric controlling unit 50 is disposed on the shell 40 and exposed, the electric controlling unit 50 further includes a circuit board 57, at least one light source 58, a light-guiding member 59 and a reset key 60, the circuit board 57 shows the data of each said filtering mechanism 20 and the magnetizer 30, the at least one light source 58 varies based on the data of each said filtering mechanism 20 and the magnetizer 30, and the light-guiding member 59 guides light emitted from the at least one light source 58 and a process of guiding light is viewable from outside of the shell 40. For example, the circuit board 57 and the at least one light source 58 can cooperate (the cooperation of the circuit board 57 and the at least one light source 58 may cooperate with each other or function respectively) to provide the data of the total amount, the water quality or the reminders of replacing elements so that the user can consider whether to replace the filter cartridge or not. Preferably, the light-guiding member 59 further has a penetrating hole 61 which corresponds to the reset key 60, and the penetrating hole 61 is for a needle to penetrate therethrough so as to actuate the reset key 60 to reset settings of the water purifier. The electric controlling unit 50 may further have at least one operation button for setting or obtaining the water usage information or the data of the water purifier. The water leak sensor 55 (in a contact type or a non-contact type) can detect if the water purifier has a leaking problem and transmits information to the electric controlling unit 50 to control the water purifier 1 to cut off water and electricity to prevent accidents from taking place. The electric controlling unit 50 may further have an operation controlling panel (not shown), the operation controlling panel may be assembled on an exterior of the shell corresponding to the circuit board, and preferably, the operation controlling panel may be separated from the shell to form a portable and independent object.

Given the above, the water purifier has a preferable thorough structural strength, especially the plastic cover which is often used. In addition, the throttle valve can cooperate with the identity identification mechanism, the flow meter, the wireless transmitter, the wireless receiver and the water leak sensor to control the flow so as to ensure the quality of safety of the drinking water locally or remotely.

While we have shown and described various embodiments in accordance with the present invention, it should be clear to those skilled in the art that further embodiments may be made without departing from the scope of the present invention.

What is claimed is:

1. A water purifier, including:
   a framework, including a plurality of vertical supporting members which are respectively vertically arranged in intervals and a metal frame which is disposed on top ends of the plurality of vertical supporting members, the metal frame having two first through holes;
   two filtering mechanisms, received in the framework and connected in series, one of the two filtering mechanisms for being connected to a water source;
   a magnetizer, received in the framework, the magnetizer connected to the other of the two filtering mechanisms in series and being communicable with outside;
   a shell, covering the framework, including a plastic cover covering the metal frame, the plastic cover including two first pass holes which correspond to the two first through holes and two cover bodies which are disposed on the two first pass holes, the two cover bodies being capable of sealing the two filtering mechanisms respectively;
   wherein each said cover body includes a cover main body, a pressurizing mechanism which is pivoted to the cover main body, a pressurizing sheet which is connected to the pressurizing mechanism, and a flexible ring which is disposed between the cover main body and a periphery of the pressurizing sheet, movement of the pressurizing mechanism drives the pressurizing sheet to move toward the cover main body and squeeze the flexible ring, and the flexible ring is squeezed to deform radially to contact an inner wall of the filtering mechanism tightly.

2. The water purifier of claim 1, which the framework further includes a bottom board, and the bottom board and the metal frame are detachably disposed on two opposite ends of the plurality of vertical supporting members.

3. The water purifier of claim 1, wherein the metal frame is detachably disposed on the plurality of vertical supporting members, the plastic cover further includes a plastic frame which is detachably disposed on the metal frame and a cover frame which covers the plastic frame, and the plastic frame and the cover frame are penetrated corresponding to each other to form the two first pass holes.

4. The water purifier of claim 1, wherein each said filtering mechanism includes a barrel member and a filter cartridge, two ends of the barrel member which are opposite to each other respectively have an inlet opening which is sealed by the flexible ring and an inserting opening which communicates with and between the water source and the magnetizer, and the filter cartridge is inserted from the inlet opening, into the barrel member and into the inserting opening upside down via a communicating connector.

5. The water purifier of claim 4, wherein one of two ends of the barrel member has a connecting base and a cover member, the connecting base includes an exterior threaded ring and an interior connecting ring surrounded by the exterior threaded ring, the exterior threaded ring and the interior connecting ring define a water inlet space, the interior connecting ring has the inserting opening, the cover member includes a central through opening and a plurality of communicating holes which surround the central through opening, the cover member is screwed to the exterior threaded ring, and the plurality of communicating holes communicate with the water inlet space and an interior of the barrel member.

6. The water purifier of claim 5, wherein the framework further includes a bottom board, and the bottom board and the metal frame are screwed on two opposite ends of the plurality of vertical supporting members; the plastic cover further includes a plastic frame which is detachably disposed on the metal frame and a cover frame which covers the plastic frame, and the plastic frame and the cover frame are penetrated corresponding to each other to form the two first pass holes; the metal frame further has a second through hole which corresponds to the magnetizer, the plastic frame and the cover frame are further penetrated corresponding to each other to form a second pass hole, and the shell further includes a sealing cover covering the second pass hole; the plastic frame radially and protrudingly has a plurality of restricting grooves, the cover main body is integrally formed and protrudingly has a plurality of restricting ribs on a circumferential side thereof, and each said restricting rib is releasably rotated and engaged with one of the restricting grooves; the framework further includes a plurality of hooping frames, and the plurality of hooping frames are adjustably hooped on the two filtering mechanisms and the magnetizer; the pressurizing mechanism includes a screw member which is disposed through the pressurizing sheet and the cover main body, a pivotal axle which is attached to one end of the screw member and located on two opposite sides of cover main body with the pressurizing sheet, and a handle member which is pivoted to the pivotal axle, the handle member includes an abutting head which is eccentrically pivoted to the pivotal axle, and when the handle member is swung, the abutting head abuts against the cover main body and pulls to pressurizing sheet to squeeze the flexible ring.

7. The water purifier of claim 1, wherein the pressurizing mechanism includes a screw member which is disposed through the pressurizing sheet and the cover main body, a pivotal axle which is attached to one end of the screw member and located on two opposite sides of cover main body with the pressurizing sheet, and a handle member which is pivoted to the pivotal axle, the handle member includes an abutting head which is eccentrically pivoted to the pivotal axle, and when the handle member is swung, the abutting head abuts against the cover main body and pulls the pressurizing sheet to squeeze the flexible ring.

8. The water purifier of claim 1, further including an electric controlling unit and a throttle valve which is electrically connected to the electric controlling unit, the throttle valve connected to and between the water source and a water outlet end, each said filtering mechanism having an identification identity, the electric controlling unit including an identifier, the identifier identifying and comparing the identification identity of each said filtering mechanism, if the identification identity matches one of at least one preset identification identity, the electric controlling unit controls the throttle valve to allow water to flow through the throttle valve, and if the identification identity non-matches any of the at least one preset identification identity, the electric controlling unit controls the throttle valve to prohibit water from flowing through the throttle valve.

9. The water purifier of claim 8, further including an electric controlling unit and a flow meter which is electrically connected to the electric controlling unit, the flow meter being connected to and between one of the filtering mechanisms and the magnetizer, and when a total amount of water flowing to the magnetizer reaches a preset amount, the electric controlling unit controls the throttle valve to prohibit water from flowing through the throttle valve.

10. The water purifier of claim 8, further including an electric controlling unit, a wireless transmitter which is electrically connected to the electric controlling unit and a wireless receiver, the wireless transmitter and the wireless receiver being capable of transmitting data of each said filtering mechanism wirelessly, and the data at least includes the at least one preset identification identity.

11. The water purifier of claim 8, wherein the electric controlling unit is disposed on the shell and exposed, the electric controlling unit includes a circuit board, at least one light source, a light-guiding member and a reset key, the circuit board is capable of showing data of each said filtering mechanism and the magnetizer, the at least one light source varies based on the data of each said filtering mechanism and the magnetizer, the light-guiding member guides light emitted from the at least one light source and a process of guiding light is viewable from outside of the shell, the light-guiding member further has a penetrating hole which corresponds to the reset key, and the penetrating hole is for a needle to penetrate therethrough so as to actuate the reset key to reset settings of the water purifier.

* * * * *